United States Patent [19]

Miller

[11] 4,022,272

[45] May 10, 1977

[54] TRANSMISSION FLUID HEAT RADIATOR

[75] Inventor: Bernard Miller, Portuguese Bend, Calif.

[73] Assignee: Chester O. Houston, Jr., Corona del Mar, Calif. ; a part interest

[22] Filed: Nov. 14, 1975

[21] Appl. No.: 631,827

[52] U.S. Cl. ............................ 165/51; 29/157.3 R; 60/DIG. 5; 74/606 A; 123/41.33; 123/196 AB; 165/41; 165/44; 165/78; 165/169; 165/185; 184/104 B; 192/113 R

[51] Int. Cl.² .................. F01M 5/00; F01P 11/08; F16N 39/02; F16H 57/04

[58] Field of Search ............ 184/104 B; 165/51, 44, 165/169, 41, 47, 185, 78; 123/41.33, 196 AB; 60/DIG. 5; 74/606 R, 606 A; 29/157.3 R; 192/113 R

[56] References Cited

UNITED STATES PATENTS

| | | | |
|---|---|---|---|
| 1,318,706 | 10/1919 | Talbot | 184/104 B |
| 1,365,438 | 1/1921 | Adamson | 184/104 B |
| 1,991,618 | 2/1935 | Lyman | 184/104 B |
| 2,577,188 | 12/1951 | Hall | 184/104 B |
| 3,116,541 | 1/1964 | Nickol et al. | 29/157.3 |
| 3,224,501 | 12/1965 | Burdilk et al. | 165/185 |
| 3,550,678 | 12/1970 | Pfouts | 165/44 |
| 3,817,354 | 6/1974 | Meiners | 184/104 B |
| 3,874,183 | 4/1975 | Tabet | 123/196 AB |

FOREIGN PATENTS OR APPLICATIONS

| | | | |
|---|---|---|---|
| 287,732 | 1/1932 | Italy | 184/104 B |

Primary Examiner—C. J. Husar
Assistant Examiner—Sheldon Richter
Attorney, Agent, or Firm—Ralph B. Pastoriza

[57] ABSTRACT

The heat radiator takes the form of an extruded member defining parallel fins on its bottom surface and having a flat top surface arranged to be cemented directly to the bottom surface of a transmission fluid pan in an automobile. A special cement having high thermal conductivity is used and the extruded member may be made in modular form so that the entire area of the bottom of the pan can be covered by forming a set of modular units.

4 Claims, 5 Drawing Figures

TRANSMISSION FLUID HEAT RADIATOR

This invention relates to heat radiators and more particularly to a heat radiator for radiating heat from transmission fluid in a transmission fluid pan serving as a reservoir for the fluid in automobiles.

BACKGROUND OF THE INVENTION

Transmission fluid for automobiles is generally stored in a flat shallow pan secured beneath the car to the rear of the front wheels. Considerable heat is generated in the transmission fluid or oil, particularly when a car is used for a considerable length of time and it is desirable to avoid as much as possible any overheating of the transmission fluid.

Problems arise in any attempt to provide presently available heat radiating fins on the pan to alleviate such possible overheating. First, in order that the fins be effective, there must be good conductivity between the fluid in the pan and the radiating fins themselves. Thus a secure metal-to-metal contact would be desirable but in order to secure the fins to the pan, normally holes or the like must be drilled which can cause leakage from the pan itself. In addition, the transmission pans are oftentimes of irregular shape; that is, other than rectangular or square and thus available heat radiators as might be proposed to alleviate the overheating problem may be only effective to remove heat from a portion of the pan or, if too large, extend beyond the peripheral edges of the pan and thus not function as effectively considering the added material involved. Other possible means for cooling transmission fluid would involve heat exchangers which can become bulky and costly to install.

BRIEF DESCRIPTION OF THE PRESENT INVENTION

With the foregoing considerations in mind, the present invention contemplates a transmission fluid heat radiator comprised essentially of the combination of a transmission fluid pan which serves as a reservoir for transmission fluid and an extruded member of high heat conductivity arranged to be secured over the entire bottom surface of the pan by a thermally conductive cement in such a manner as to provide excellent thermal conductivity from the fluid to the extruded member.

The extruded member itself includes a base with bottom and top surfaces, the bottom surface being defined by a series of integral parallel heat radiating fins extending downwardly in a direction normal to the plane of the base. The top surface of the member is flat and in juxtaposed relationship to the flat bottom of the pan, the thermally conductive cement securing the member rigidly in place.

A further feature of this invention contemplates making up the heat radiating member in the form of modular units which may be fitted together so that transmission fluid pans having relatively large bottom surface areas can be completely covered.

With the foregoing arrangement, drilling holes in transmission pans to secure a suitable heat radiator is avoided and optimum use of radiating material for various sized pans is realized.

BRIEF DESCRIPTION OF THE DRAWINGS

A better understanding of this invention will be had by now referring to the accompanying drawings in which.

DETAILED DESCRIPTION OF THE PREFERRED EMBODIMENT

Figure 1:
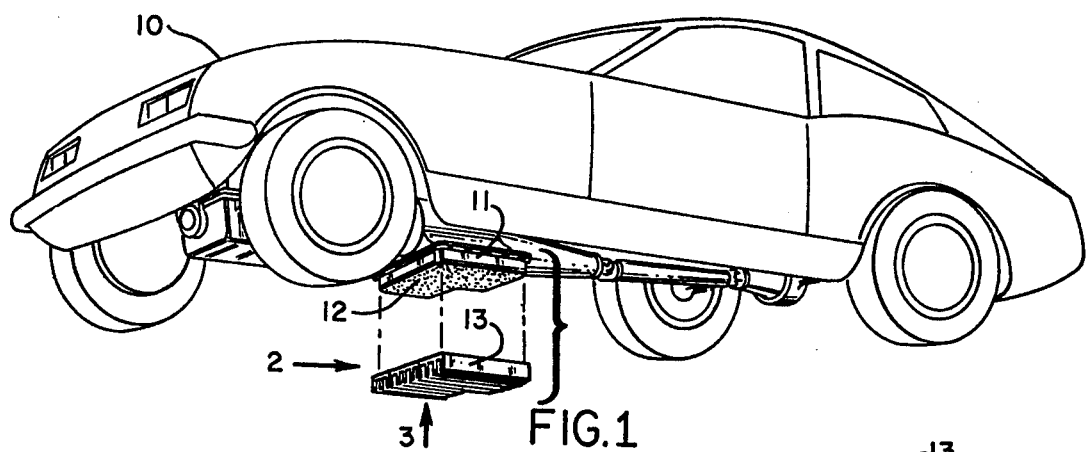
FIG. 1 is an exploded perspective view of the underside of an automobile showing a transmission fluid pan serving as a reservoir for transmission fluid with a heat radiating member in accord with the present invention exploded away therefrom.

Referring first to FIG. 1 there is shown an automobile 10 with a transmission fluid pan 11 serving as a reservoir for transmission fluid. The pan 11 is secured to the under chassis of the automobile approximately in the position shown. This pan has a flat bottom surface 12 and is normally made of metal and is of fairly shallow construction so as to not protrude downwardly from the automobile to too great an extent.

Shown below the pan 11 is an extruded member 13 of high heat conductivity serving as a heat radiator. As will become clearer as the description proceeds, the heat radiator 13 is arranged to be secured in a manner to cover the entire bottom 12 of the pan 11.

Figure 2:
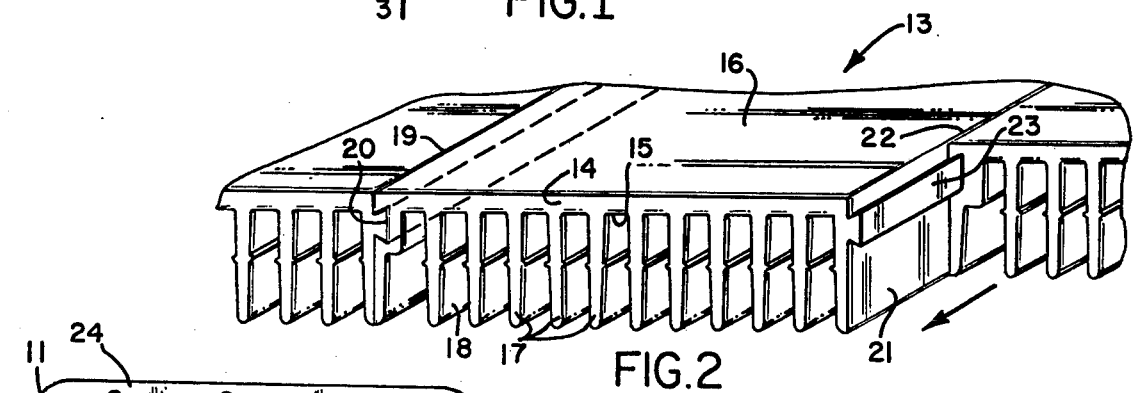
FIG. 2 is an enlarged fragmentary perspective view of a portion of the heat radiating member looking in the direction of the arrow 2 of FIG. 1.

Referring now to the enlarged fragmentary perspective of FIG. 2, it will be noted that the heat radiator 13 in the form of the extruded member includes a base 14 with bottom and top surfaces 15 and 16 respectively. The bottom surface 15 is essentially defined by a series of integral parallel heat radiating fins 17 extending downwardly in a direction normal to the plane of the base. The top surface 16 is flat as shown. Preferably, the extruded member 13 is formed of aluminum.

In the preferred embodiment of this invention, the extruded member 13 includes a modular unit of generally rectangular shape having a given number of fins extending in the longitudinal direction of the member.

Thus, still referring to FIG. 2, the modular unit 14 includes an outside fin 18 on one longitudinal side 19. This outside fin includes a dove-tail groove 20 running therealong. The other outside fin 21 on the opposite longitudinal side 22 of the modular unit 14 includes in turn a dove-tail shaped tongue 23 of corresponding dimensions to the groove 20.

With the foregoing arrangement, it will be evident that a number of modular units may be slid together in side-by-side relationship, such intercoupling being indicated by the arrow in FIG. 2 for a next modular unit to the right of the unit 14. An overall top surface area can thus be formed corresponding to the bottom area of the pan in the event this bottom area is greater than the top surface area of one modular unit.

Figure 3:
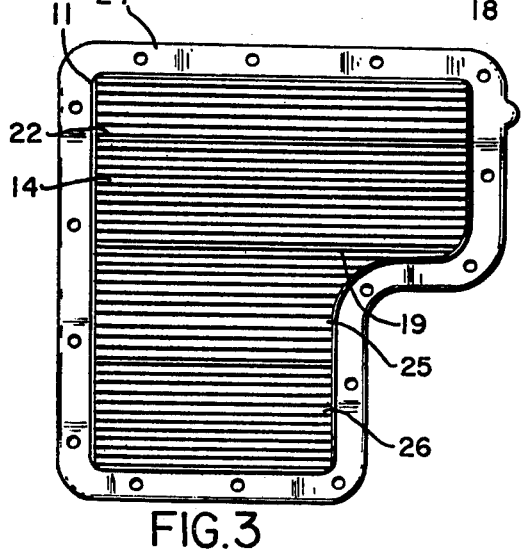
FIG. 3 is a bottom plan view of the transmission fluid heat radiator looking in the direction of the arrow 3 of FIG. 1.

FIG. 3 shows in bottom plan view the pan 11 provided with a suitable securing flange 24, the modular unit 14 being shown secured to a bottom portion of the pan. Similar modular units 25 and 26 in turn are shown in side-by-side relationship with the modular unit 14 to cover the complete bottom surface of the pan. In the particular embodiment illustrated in FIG. 3, the perimeter of the pan is irregularly shaped. In this event, the modular units may be trimmed to provide a modular set having a perimeter corresponding to that of the bottom of the pan so that congruency may be achieved between the top surface and bottom of the pan for such irregularly shaped pans.

In FIG. 3, the opposite longitudinal sides 19 and 22 described in FIG. 2 are indicated for the modular unit 14.

In accord with an important feature of this invention, the top surface of the modular units or in the event only a single extruded modular unit is used, its top surface is juxtaposed the bottom 12 of the pan 11 of FIG. 1 and is secured thereto by a thermally conductive cement.

Figure 4:
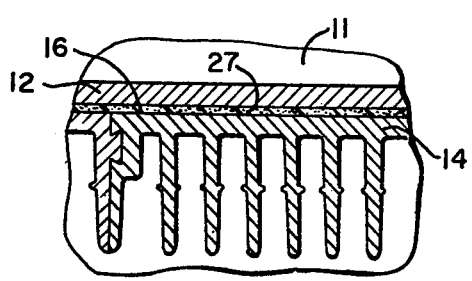
FIG. 4 is a fragmentary cross section illustrating the securement of the radiator to the bottom of the pan; and, FIG. 5 are rate of cooling plots illustrating the improved cooling realized by the present invention.

FIG. 4 shows a fragmentary enlarged cross section of the actual securement of the modular unit 14 to the bottom of a pan 11, the top surface 16 of the modular unit being juxtaposed to the bottom 12 of the pan and incorporating therebetween the thermally conductive cement shown at 27. In making up the assembly, care is taken to assure that there will be no gaps or air spaces between the unit or member 14 and bottom surface of the pan so that excellent thermal conductivity will be achieved from transmission fluid in the pan 11 through its bottom surface to the top surface 16 of the radiating member.

Because of the ability to build up a suitably sized heat radiator in the form of the modular units and the added ability to simply cut the same, the entire bottom surface of the pan regardless of its particular shape can be properly covered to achieve optimum heat transfer from the transmission fluid to the heat radiating fins. There is no necessity for piercing or drilling holes in the transmission pan itself to effect any type of securement.

Figure 5:
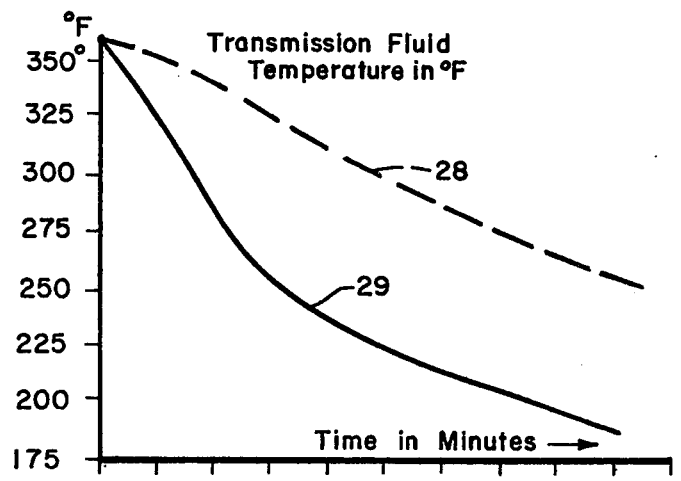

Utilizing the combination of the pan, heat radiating member, and thermally conductive cement, a surprising and unexpected increase in the rate of cooling of the transmission fluid results. FIG. 5 graphically illustrates this improved rate of cooling wherein there is indicated at 28 a normal cooling curve for transmission fluid and at 29 the greatly increased cooling curve resulting from the present invention.

In FIG. 5, it will be noted that it takes approximately 10 minutes to cool transmission fluid from 350° to 250° F in the absence of the present invention whereas when the transmission fluid heat radiator of the present invention is utilized, the transmission fluid is cooled from 350° down to approximately 185° F in the same ten minute interval. Thus there is at least a 30% increase in the rate of cooling.

From the foregoing description, it will be evident that the present invention has provided an improved means for radiating heat in transmission fluid wherein problems associated with prior proposed systems are avoided.

What is claimed is:

1. A transmission fluid heat radiator comprising, in combination:
   a. a transmission fluid pan serving as a reservoir for transmission fluid and having a flat bottom;
   b. an extruded member of high heat conductivity constituting a base with bottom and top surfaces, the bottom surface being defined by a series of integral parallel heat radiating fins extending downwardly in a direction normal to the plane of the base, the top surface being flat and in juxtaposed relationship to said flat bottom of said pan; and,
   c. a thermally conductive cement between said flat bottom of said pan and said top surface of said member securing the same to said pan whereby heat from transmission fluid in said pan is thereby conducted to said member by said thermally conductive cement and radiated by said fins.

2. A transmission fluid heat radiator according to claim 1, in which said extruded member constitutes a modular unit of rectangular shape having a given number of fins extending in the longitudinal direction of the member, the outside fin on one longitudinal side of said member having a dove-tail groove, running therealong and the outside fin on the opposite longitudinal side having a dove-tail shaped tongue of corresponding dimensions to said groove whereby a number of modular units may be slid together in side-by side relationship to provide an overall top surface area corresponding to the bottom area of said pan when said bottom area is greater than the top surface area of one modular unit.

3. A transmission fluid heat radiator according to claim 2, in which any one or more of said modular units may be trimmed to provide a modular set having a perimeter corresponding to that of the bottom of the pan so that congruency may be achieved between the top surface and bottom of the pan for irregularly shaped pans.

4. A transmission fluid heat radiator according to claim 3, in which the rate of cooling of fluid by the modular set is increased by at least 30% over the rate in the absence of the modular set.

* * * * *